(12) United States Patent
Arseneault et al.

(10) Patent No.: US 7,441,716 B2
(45) Date of Patent: Oct. 28, 2008

(54) ALUMINUM RECOVERING DRY SYSTEM AND PROCESS

(76) Inventors: Emile Arseneault, 999, Avenue Mathieu, Saguenay, QC (CA) G7B 1K4; Andre Simard, 2402, des Gradeliers, Saguenay, QC (CA) G7B 4N9

( * ) Notice: Subject to any disclaimer, the term of this patent is extended or adjusted under 35 U.S.C. 154(b) by 86 days.

(21) Appl. No.: 11/625,766

(22) Filed: Jan. 22, 2007

(65) Prior Publication Data
US 2007/0114309 A1    May 24, 2007

Related U.S. Application Data

(63) Continuation-in-part of application No. 11/416,413, filed on May 3, 2006.

(30) Foreign Application Priority Data
May 12, 2005    (CA) .................................... 2506718

(51) Int. Cl.
*B02C 19/00* (2006.01)
(52) U.S. Cl. .................... 241/19; 241/24.14; 241/29; 241/57; 241/79.1
(58) Field of Classification Search ............... 241/29, 241/79.1, 57, 19, 24.14
See application file for complete search history.

(56) References Cited

U.S. PATENT DOCUMENTS 4,119,453 A * 10/1978 Knezevich ................. 428/547
4,923,126 A    5/1990  Lodovico
5,769,331 A    6/1998  Yamagishi et al.
5,855,644 A    1/1999  Takashima
6,315,222 B1   11/2001 Kim et al.
6,663,029 B2   12/2003 Takano et al.
6,745,960 B1   6/2004  Myo et al.
6,971,594 B1   12/2005 Polifka
7,040,562 B2   5/2006  Sawant et al.
7,090,159 B2   8/2006  Condon et al.

FOREIGN PATENT DOCUMENTS

CA           1129834           8/1982

* cited by examiner

*Primary Examiner*—Mark Rosenbaum
(74) *Attorney, Agent, or Firm*—Buchanan Ingersoll & Rooney PC

(57) ABSTRACT

A closed circuit, dry processing system for processing aluminum containing products and producing reusable particles of aluminum, and a process thereof. The aluminum containing products are crushed into chips which are then separated into iron-based and ironless chips. The ironless chips are further crushed into chip fragments which are controllably supplied into a granulation chamber where the chip fragments are granulated into spheroidal particles of aluminum and other particles of organic and carbonic materials. A controlled upward airflow produced in the granulation chamber draws those of the particles exceeding a desired granulation degree out of the granulation chamber. The particles are classified as a function of their sizes and then separated as a function of their weight so that the spheroidal particles of aluminum forming the reusable particles of aluminum and residues formed by the other particles are released separately.

36 Claims, 2 Drawing Sheets

ALUMINUM RECOVERING DRY SYSTEM AND PROCESS

CROSS-REFERENCE TO RELATED APPLICATIONS

The present application is a continuation-in-part application of U.S. Ser. No. 11/416,413, which was filed in the US on May 3, 2006, and which claims the priority of Canadian Patent Application No. 2,506,718, which was filed in Canada on May 12, 2005. The present application incorporates by reference the entire contents of U.S. Ser. No. 11/416,413 and Canadian Patent Application No. 2,506,718.

FIELD OF THE INVENTION

The present invention relates to a closed circuit, dry processing system for processing aluminum containing products and producing reusable spheroidal particles of aluminum, and a dry process thereof.

BACKGROUND

Aluminum is used in many kinds of manufactured products and has many applications. It can be found for example in numerous food related products such as plates, paper or foil, cans and other containers used for food packaging and wrapping. A large amount of aluminum is used especially for making beverage cans. Aluminum can also be found in lithographic sheets used by printers, in construction materials used by the commercial and residential building industry, in cosmetic and residential building industry, in cosmetic powders, in paints, etc.

It is obviously desirable to recover the aluminum in the aluminum containing products after their use, for recycling purposes. Current aluminum recovery processes are mainly based on melting the products and then performing a number of separation steps on the liquefied product to recover the aluminum and/or recasting steps to produce new aluminum-based products. Such processes are energy intensive and generally produce undesirable fumes.

Dry processes and machinery for recovering certain types of materials such as plastics from used products are also known. But those processes often have a low processing rate, involve complex machinery prone to breakdowns, require intensive maintenance and adjustments, and/or require human interventions at different stages of the processing line.

U.S. Pat. No. 4,923,126 (Lodovico et al.), U.S. Pat. No. 5,769,331 (Yamagishi et al.), U.S. Pat. No. 5,855,644 (Takashima), U.S. Pat. No. 6,315,222 (Kim et al.), U.S. Pat. No. 6,663,029 (Takano et al.), U.S. Pat. No. 6,745,960 (Myo et al.), U.S. Pat. No. 6,971,594 (Polifka), U.S. Pat. No. 7,040,562 (Sawant et al.), U.S. Pat. No. 7,090,159 (Condon et al.) and Canadian patent No. 1,129,834 (Knezevich) provide examples of known processes and systems or machinery. Yet, none of them provides a complete, simple, efficient and environment friendly solution for recovering aluminum in aluminum containing products, with the recovered aluminum satisfying high quality standards at a high production rate. The aluminum recovered by the currently known systems and processes often has a poor degree of quality and/or an inconvenient form, which limits the applications where the recovered aluminum can be reused.

SUMMARY

An object of the invention is to provide a closed circuit, dry processing system and a process thereof for processing aluminum containing products and producing reusable spheroidal particles of aluminum.

Another object of the invention is to provide such a system and process which have low energy consumption and is capable of recovering aluminum at a high production rate.

Another object of the invention is to provide such a system and process which can produce recovered aluminum having a more uniform quality and may contain little residues and thus exhibit a high degree of purity.

Another object of the invention is to provide such a system and process which can be easy to adjust to recover aluminum and produce particles satisfying various quality standards.

Another object of the invention is to provide such a system and process which can produce particles of aluminum reusable in an extended range of applications.

Another object of the invention is to provide such a system and process which can produce spheroidal particles of aluminum having a large contact surface and a high cubic density, as preferred in aluminothermic processes often used in specialized alloy foundries, or for industrial explosives often used in mining survey, or for aluminum recasting in large aluminum production plants, or for use as a combustible.

According to one aspect of the present invention, there is provided a closed circuit, dry processing system for processing aluminum containing products and producing reusable particles of aluminum, comprising:

a pre-crusher unit for crushing the aluminum containing products into chips;

a magnetic separator arrangement for separating the chips coming from the pre-crusher unit into iron-based chips and ironless chips;

a crusher unit for crushing the ironless chips into chip fragments;

a feeder unit for controlling supply of the chip fragments at a predetermined rate;

a vertical granulator unit for granulating the chip fragments supplied by the feeder unit into spheroidal particles of aluminum and other particles of organic and carbonic materials, the vertical granulator unit having a lower inlet for receiving the chip fragments from the feeder unit, an upper outlet, and a granulation chamber between the inlet and the outlet;

a means for producing a controlled upward airflow in the granulation chamber drawing those of the particles exceeding a predetermined granulation degree out through the outlet of the vertical granulator unit;

a sifter unit for classifying the particles coming from the vertical granulator unit as a function of their sizes; and a separator arrangement for separating the particles classified by the sifter as a function of their weight, the separator arrangement having a first outlet arrangement for releasing the spheroidal particles of aluminum and a second outlet arrangement for releasing residues formed by the other particles, the spheroidal particles of aluminum forming the reusable particles of aluminum.

According to another aspect of the present invention, there is also provided a closed circuit, dry process for producing reusable particles of aluminum from aluminum containing products, comprising the steps of:

crushing the aluminum containing products into chips;

separating the chips into iron-based chips and ironless chips;

crushing the ironless chips into chip fragments;

controlling supply of the chip fragments at a predetermined rate into a granulating chamber through a lower outlet thereof;

granulating the chip fragments in the granulating chamber into spheroidal particles of aluminum and other particles of organic and carbonic materials;

producing a controlled upward airflow in the granulation chamber drawing those of the particles exceeding a predetermined granulation degree out of the granulating chamber through an upper outlet thereof;

classifying the particles as a function of their sizes; and separating the classified particles as a function of their weight into the spheroidal particles of aluminum and residues formed by the other particles, the spheroidal particles of aluminum forming the reusable particles of aluminum.

Preferably, the vertical granulator unit has a rotor and a stator about which the rotor turns, a space between the rotor and the stator defining the granulation chamber, the stator having a cylindrical stationary crenelated surface facing the rotor, the rotor having a cylindrical rotating surface facing the stator provided with laterally shifted rows of circumferentially distributed cutting blades extending above one another. The cutting blades of the rows preferably form slanted blade arrangements projecting from the rotating surface with respect to a vertical direction of the vertical granulator unit, for example at an angle of about 15° with respect to the vertical direction of the vertical granulator unit. The cutting blades of a number of the rows, preferably the uppermost ones, may extend at a closer distance from the stationary surface than the cutting blades of other ones of the rows. A distance of the cutting blades from the crenelated surface may vary in a range of about 0.15 cm to 0.8 cm.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 1:
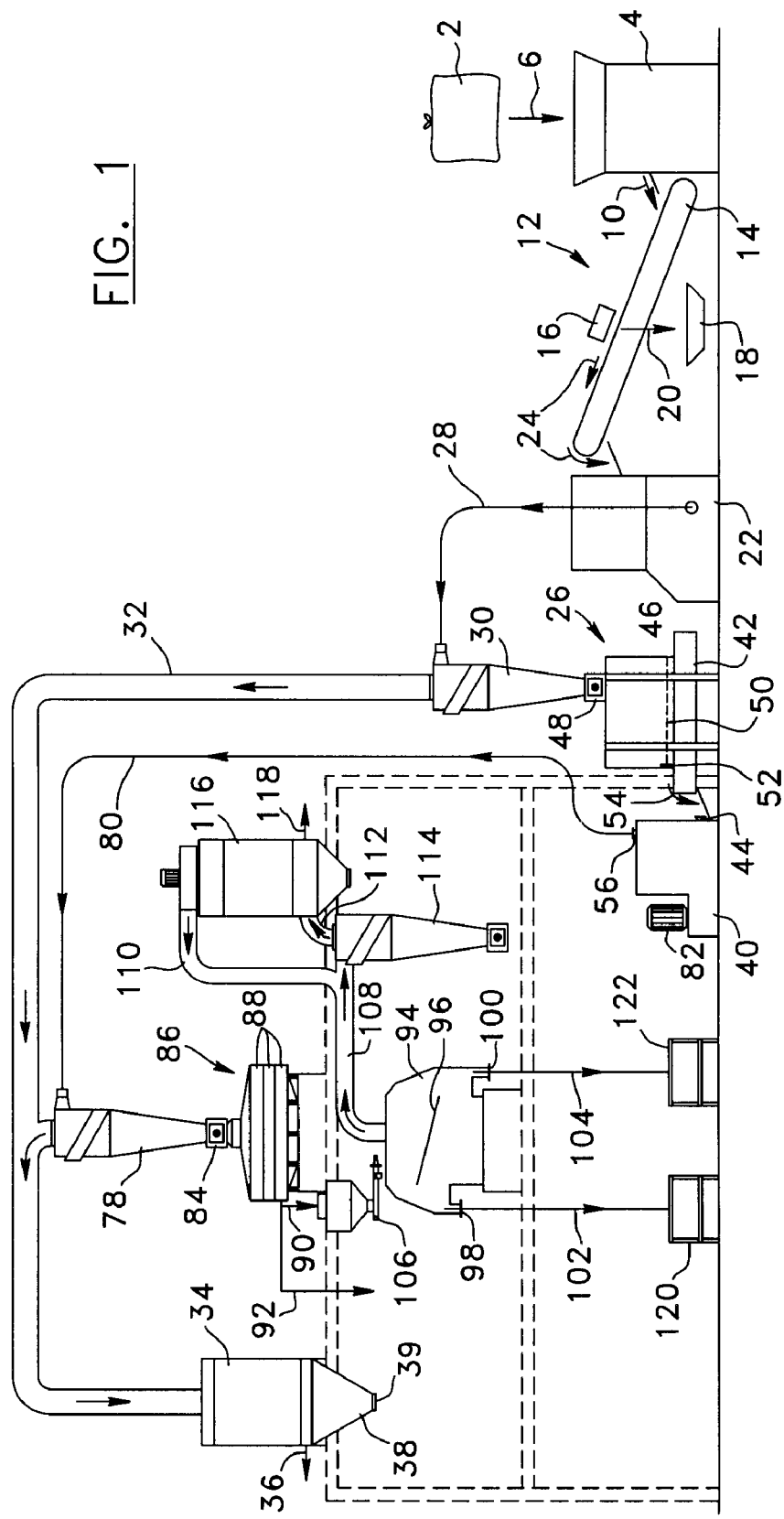
FIG. 1 is a schematic diagram of the closed circuit, dry processing system.

Referring to FIG. 1, there is shown a closed circuit, dry processing system for processing and producing reusable particles of aluminum from aluminum containing products 2. The aluminum containing products 2 may come from various sources of used articles or products, for example from aluminum products collected in recycling depot, from lithographic aluminum plates used by printers, from aluminum chips, cuttings or turnings coming from the primary, secondary and tertiary aluminum processing industry. The aluminum containing products 2 may be received in the form of pressed bundles of different dimensions, typically from 1 to 4 cubic feet (from approx. 0.028 to 0.113 cubic meter), or in bulk form. Best results to produce particles having an advantageous size in a range of about 0.1 mm to 2.5 mm can be obtained with the present system using aluminum containing products 2 having a thickness of 0.3 mm or less. Thicker products can however also be processed if desired.

The aluminum containing products 2 are loaded in a pre-crusher unit 4, as depicted by arrow 6. The pre-crusher unit 4 crushes the aluminum containing products 2 into chips including non aluminum residues and preferably having sizes in a range of about 1½×1½ inch (approx. 1.25 cm×1.25 cm).

The chips are delivered through an outlet of the pre-crusher unit 4, as depicted by arrow 10, and transferred to a magnetic separator arrangement 12. The magnetic separator arrangement 12 may be formed, as illustrated, of a belt conveyor 14 and a magnet unit 16 extending over the conveyor 14 for magnetically attracting and extracting the iron-based chips among the chips coming from the pre-crusher unit 4 and transported by the conveyor 14. Other types of conveyor can be used if desired provided that it can be equipped with a magnet unit, for example an electromagnet. The iron-based chips separated by the magnet unit 16 can be collected by a container 18 extending under the conveyor 14 and the magnet unit 16, as depicted by arrow 20.

The remaining chips, mainly made of ironless chips, are transported by the conveyor 14 to a crusher unit 22, as depicted by arrows 24. The crusher unit 22 further crushes the ironless chips into chip fragments preferably having sizes in a range of about (¼×¼ inch to ½×½ inch (approx. 0.63 cm×0.63 cm to 1.25 cm×1.25 cm), depending on the initial product and the desired end product. At this stage, non aluminum residues are still present in the line.

The chip fragments are transferred to a feeder unit 26, for example by transportation through a cyclonic arrangement made of a pneumatic line 28 coupled to a cyclone 30. The cyclonic arrangement can be assisted by a dust filtering arrangement made of a conduit 32 and a dust filter unit 34 for collecting and separating dust particles among the chip fragments transported from the crusher unit 22, and releasing filtered air as depicted by arrow 36. The dust filter unit 34 may have a lower dust collecting bin 38 provided with a trap 39 for emptying the dust filter unit 34.

The feeder unit 26 controls supply of the chip fragments at a predetermined rate to a vertical granulator unit 40. The feeder unit 26 may be formed of a conveyor 42 for transporting the chip fragments to the vertical granulator unit 40, and a transfer bin 46 having an upper inlet for receiving the chip fragments from the crusher unit, for example through a rotary valve 48 mounted at the bottom of the cyclone 30 and controllably releasing the chip fragments in the transfer bin 46. The transfer bin 46 has a lower outlet depicted by stipple line 50 for delivering the chip fragments onto the conveyor 42, and an adjustable gating member 52 for controlling a thickness and thus a transfer rate of the chip fragments fed to the vertical granulator 40 by the conveyor 42, as depicted by arrow 54.

The vertical granulator unit 40 granulates the chip fragments supplied by the feeder unit 26 into spheroidal particles of aluminum and other particles of organic and carbonic materials.

Figure 2:
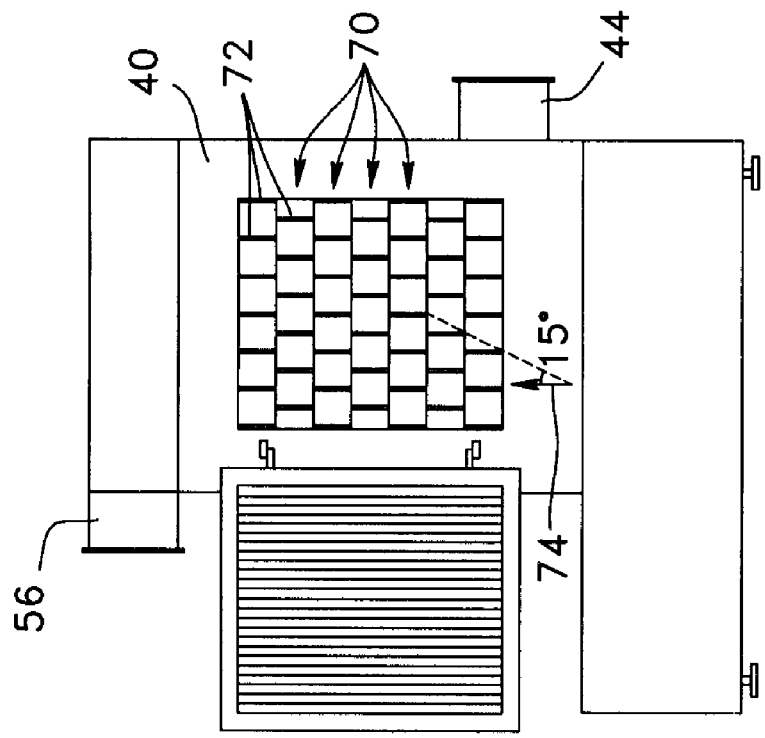
FIG. 2 is a schematic diagram of a vertical granulator unit as used in the system.

Referring to FIG. 2, the illustrated vertical granulator unit 40 has a lower inlet 44 for receiving the chip fragments from the feeder unit 26 (shown in FIG. 1), an upper outlet 56, and a granulation chamber 58 between the inlet 44 and the outlet 56.

Figure 3:
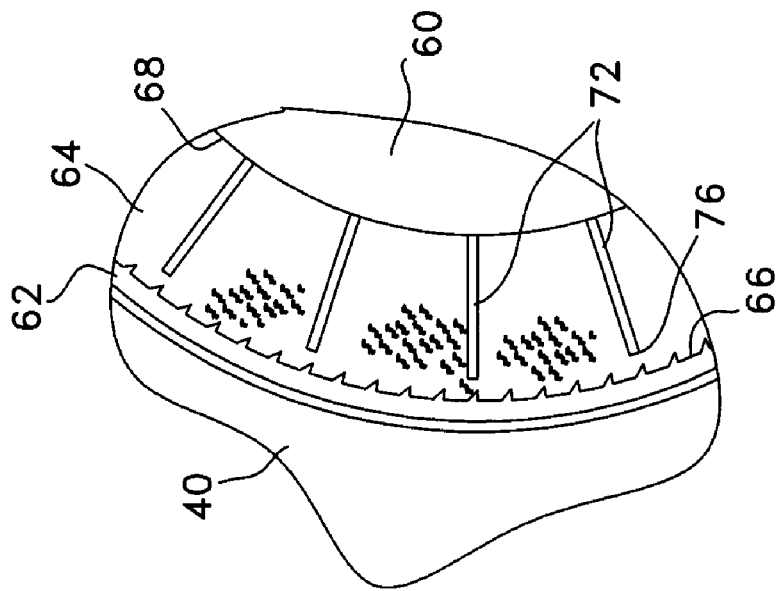
FIG. 3 is a schematic partial top view of an inner portion of the vertical granulator unit.

Referring to FIG. 3, the illustrated vertical granulator unit 40 has a rotor 60 and a stator 62 about which the rotor 60 turns. A space 64 between the rotor 60 and the stator 62 defines a granulation chamber. The stator 62 has a cylindrical stationary crenelated surface 66 facing the rotor 60. The rotor 60 has a cylindrical rotating surface 68 facing the stator 62, provided with laterally shifted rows 70 of circumferentially distributed cutting blades 72 extending above one another as shown in FIG. 2. The cutting blades 72 of the rows 70 form slanted blade arrangements projecting from the rotating surface 68 with respect to a vertical direction of the vertical granulator unit 40, as depicted by arrow 74 (see FIG. 2). The slanted blade arrangements preferably form an angle of about 15° with respect to the vertical direction of the vertical granulator unit 40 (see FIG. 2). The cutting blades 72 of a number of the rows 70, typically the first and second uppermost ones, extend at a closer distance from the crenelated surface 66 than the cutting blades 72 of other ones of the rows 74 to force the chip fragments to remain for a longer time period in the granulation chamber so that the resulting particles have an improved round form. A distance of the cutting blades 72 from the crenelated surface 66 preferably varies in a range of about 0.15 cm to 0.8 cm for best results. The cutting blades 72 have cutting edges 76 preferably extending in the vertical direction of the vertical granulator 20 unit 40. The cutting blades 72 can be made of ceramic, steel or other appropriate materials. The slanting angle of the rows 70 of the cutting blades 72 with respect to the vertical direction, the length of the cutting blades 72, their positioning around the rotor 60 and the transfer rate of the chip fragments to the vertical granulator unit 40 are parameters which are preferably adjusted depending on the type of product to be processed by the system, for example beverage cans, food cans, etc., to obtain best results. The adjustments can be achieved by performing metallurgic and granulometric analysis on samples of the aluminum particles recovered with the system, and then changing the parameters accordingly.

Referring to FIGS. 1, 2 and 3, a controlled upward airflow is produced in the granulation chamber, for example by vacuum effect drawing air out of the granulation chamber, so as to draw those of the particles exceeding a predetermined granulation degree out through the outlet 56 of the vertical granulator unit 40. The upward airflow can be produced through a cyclonic arrangement made of a cyclone 78 coupled to a pneumatic line 80 connected to the outlet 56 of the vertical granulator unit 40, which is also used for transportation of the particles. The upward airflow may also contribute to draw the chip fragments through the inlet 44 of the vertical granulator unit 40 in addition to the vacuum effect produced by rotation of the cutting blades 72 (see FIGS. 2 and 3). The chip fragments are thus drawn from the bottom to the top of the vertical granulator unit 40. In a typical configuration, the vertical granulator unit 40 has 5 to 10 rows 70 of cutting blades 72, the rotor 60 has a diameter varying from about 0.75 m to 1.5 m, and its rotation speed varies from about 1600 to 2300 RPM and can be adjusted by the motor 82. The chip fragments inside the granulation chamber are stroke and projected against the crenelated surface 66 of the stator 62 by the cutting blades 72 and bounce many times against one another, against the crenelated surface 66 and against the cutting blades 72 until they reach a particulate form corresponding to the desired granulation degree (e.g. proper dimensions and weight). The granulation degree mainly depends on the time period passed by the chip fragments inside the granulation chamber 64, which can be controlled by the upward airflow as a function of the different operational parameters of the vertical granulator unit 40 such as the rotation speed of the rotor 60, its diameter, the number of rows 70 of cutting blades 72, in order to transform the chip fragments into the desired spheroidal particles, preferably having sizes in a range of about 0.1 mm to 2.5 mm. The pressure intensity of the upward airflow determines the time passed by the chip fragments inside the granulation chamber, which determines the number of blows that the chip fragments receive, the number of blows having a direct effect on the quality of the spheroidal shape and the dimension of the particles drawn out of the vertical granulator unit 40. The rotor 60 is preferably mounted on bearings (not shown) adapted to dusty conditions and to repeated impacts during operation. The airflow in the vertical granulator unit 40 may contribute to the cooling of the particles inside the granulation chamber, against the heat produced by their collisions during the process.

Referring back to FIG. 1, it is at this granulation stage of the process that organic and carbonic materials such as paints and other subsidiary substances considered as residues get detached from the chip fragments and form particles of their own in suspension in the vertical granulator unit 40, in addition to the particles mostly if not entirely made of aluminum.

The particles drawn out of the vertical granulator unit 40 are transported through the pneumatic line 32 to the cyclone 78, which is also preferably assisted by a dust filtering arrangement formed for example by the conduit 32 and the dust filter unit 34. The particles released by the cyclone, for example through a rotary valve 84, fall in a sifter unit 86 for classifying the particles coming from the vertical granulator unit 40 as a function of their sizes, e.g. their diameters, according to client requirements. The sifter unit 86 may have a vibrating sifting stage 88 for each classified range of the particles, and an outlet arrangement for separately delivering each classified range of the particles, for example multiple outlets depicted by arrow 90 and one outlet depicted by arrow 92 for delivering powders resulting from sifting. At this stage, particles of residues are still in suspension in the process, mixed with the spheroidal particles of aluminum. Additional sifter units (not shown) may be arranged in parallel if desired according to the desired granulometric requirements of the finished products.

The classified particles are transferred to a separator unit 94 provided for each range of particles classified by the sifter unit 86 (only one separator unit 94 is shown in the Figure). The separator units 94 may be of the type having a tilt table 96 for separating the classified particles of thus similar dimensions as a function of their weight, and first and second outlets 98, 100 extending on opposite sides of the tilt table 96 for releasing respectively the spheroidal particles of aluminum forming the reusable particles of aluminum, as depicted by arrow 102, and the residues formed by the other particles, as depicted by arrow 104. The separator units 94 may be adjustable so as to adapt to various situations like, for example, separating aluminum from plastic, from paper, from rubber, etc. A separator arrangement made of multiple separator units 94 with corresponding first and second outlet arrangements 98, 100 will be used for example to process multiple classified ranges of particles (1, 2, 3 or more separator units 94 may be used in a same production line-it depends on the number of outlets 90 of the sifter unit 86 and the materials to be separated). The transfer of the classified particles from the outlets 90 of the sifter unit 86 to the separator units 94 can be achieved through a screw feeder arrangement 106 as in the illustrated case, or by simple gravity or in any other convenient way if desired.

A cyclonic separating and dust filtering arrangement made of conduits 108, 110, 112, a cyclone 114 and a dust filter unit 116 can be coupled to the arrangement of separator units 94, for collecting and separating airborne particles and dust particles among the particles processed by the separator units 94, and releasing filtered air as depicted by arrow 118.

The finished products, i.e. the particles of aluminum and the particles of residues, may fall into respective bags or containers 120, 122 weighed for example to hold one ton per bag and then stored in a ready state for shipping to the clients. Metallurgical and granulometric analysis of the finished products can be performed according to the specifications and standards of the clients.

The spheroidal particles of aluminum recovered by the system have a very high quality due to their spheroidal form which increases their contact surface for subsequent processing, and a possible density of about 88 pounds per cubic foot. They are particularly adapted to be reuse in applications such as recasting, aluminothermy, as solid combustible, as industrial explosives, as paint materials, and in many other applications. It is highly advantageous that the particles be spheroidal or spherical to provide the largest surface in contact with oxygen. The fact that the particles obtained with the system are practically round gives a stable and regular combustion. Such stability is sought by those using aluminothermic processes. It is much easier to control the process with the product obtained with the present system and according to the present process than with products in the form of chips or cuttings which have to be mixed together. The product recovered with the present system is fully ready to be reused and is advantageously comparable to a product resulting from liquid aluminum atomization as also used in aluminothermic processes.

The pneumatic conveyors 28, 80 form advantageous ways of transporting the chip fragments and the particles as their pressure intensity is easily adjustable to increase or reduce the transportation speed at strategic locations in the system to obtain a finished product within the quality standards requested by various clients.

While embodiments of this invention have been illustrated in the accompanying drawings and described above, it will be evident to those skilled in the art that changes and modifications may be made therein without departing from the essence of this invention. For example, separate dust filters may be used instead of a common dust filter unit 34. The sifter unit 88 and the separator units 94 may be of other types providing appropriate classification and separation of the particles.

The invention claimed is:

1. A closed circuit, dry processing system for processing aluminum containing products and producing reusable particles of aluminum, comprising:
   a pre-crusher unit for crushing the aluminum containing products into chips;
   a magnetic separator arrangement for separating the chips coming from the pre-crusher unit into iron-based chips and ironless chips;
   a crusher unit for crushing the ironless chips into chip fragments;
   a feeder unit for controlling supply of the chip fragments at a predetermined rate;
   a vertical granulator unit for granulating the chip fragments supplied by the feeder unit into spheroidal particles of aluminum and other particles of organic and carbonic materials, the vertical granulator unit having a lower inlet for receiving the chip fragments from the feeder unit, an upper outlet, and a granulation chamber between the inlet and the outlet;
   a means for producing a controlled upward airflow in the granulation chamber drawing those of the particles exceeding a predetermined granulation degree out through the outlet of the vertical granulator unit;
   a sifter unit for classifying the particles coming from the vertical granulator unit as a function of their sizes; and
   a separator arrangement for separating the particles classified by the sifter as a function of their weight, the separator arrangement having a first outlet arrangement for releasing the spheroidal particles of aluminum and a second outlet arrangement for releasing residues formed by the other particles, the spheroidal particles of aluminum forming the reusable particles of aluminum.

2. The system according to claim 1, wherein the chips crushed by the pre-crusher unit have sizes in a range of about 1.25 cm×1.25 cm and a thickness of less than about 0.3 mm, the chip fragments crushed by the crusher unit have sizes in a range of 0.63 cm×0.63 cm to 1.25 cm×1.25 cm, and the particles produced by the vertical granulator have sizes in a range of about 0.1 mm to 2.5 mm.

3. The system according to claim 1, wherein the magnetic separator arrangement comprises a conveyor extending between the pre-crusher unit and the crusher unit, and a magnet unit extending over the conveyor for extracting the iron-based chips among the chips transported by the conveyor.

4. The system according to claim 3, wherein the magnetic separator arrangement comprises a container extending under the conveyor and the magnet unit for collecting the iron-based chips.

5. The system according to claim 1, wherein the means for producing the controlled upward airflow in the granulation chamber comprises a cyclonic arrangement coupled between the outlet of the vertical granulator unit and the sifter unit for transportation of the particles.

6. The system according to claim 5, where the cyclonic arrangement comprises a cyclone coupled between the vertical granulator unit and the sifter unit, the cyclone having an inlet for receiving the particles drawn from the vertical granulator unit, and a lower outlet for delivering the particles to the sifter unit.

7. The system according to claim 5, wherein the cyclonic arrangement comprises a dust filtering arrangement for collecting and separating dust particles among the particles transported from the vertical granulator unit, and releasing filtered air.

8. The system according to claim 1, further comprising a pneumatic conveyor means coupled between the crusher unit and the feeder unit for transportation of the chip fragments.

9. The system according to claim 8, wherein the pneumatic conveyor means comprises a cyclonic arrangement coupled between the crusher unit and the feeder unit.

10. The system according to claim 9, wherein the cyclonic arrangement comprises a dust filtering arrangement for collecting and separating dust particles among the chip fragments transported from the crusher unit, and releasing filtered air.

11. The system according to claim 1, wherein the feeder unit comprises:
    a conveyor for transporting the chip fragments to the lower inlet of the vertical granulator unit; and
    a transfer bin having an upper inlet for receiving the chip fragments from the crusher unit, a lower outlet for delivering the chip fragments onto the conveyor, and an adjustable gating member for controlling a thickness of the chip fragments fed to the vertical granulator by the conveyor.

12. The system according to claim 1, wherein the vertical granulator unit has a rotor and a stator about which the rotor turns, a space between the rotor and the stator defining the granulation chamber, the stator having a cylindrical stationary crenelated surface facing the rotor, the rotor having a cylindrical rotating surface facing the stator provided with laterally shifted rows of circumferentially distributed cutting blades extending above one another.

13. The system according to claim 12, wherein the cutting blades of the rows form slanted blade arrangements projecting from the rotating surface with respect to a vertical direction of the vertical granulator unit.

14. The system according to claim 13, wherein the slanted blade arrangements form an angle of about 15° with respect to the vertical direction of the vertical granulator unit.

15. The system according to claim 12, wherein the cutting blades of a number of the rows extend at a closer distance from the crenelated surface than the cutting blades of other ones of the rows.

16. The system according to claim 15, wherein the rows with cutting blades extending at a closer distance from the stationary surface comprise uppermost ones of the rows.

17. The system according to claim 12, wherein a distance of the cutting blades from the crenelated surface varies in a range of about 0.15 cm to 0.8 cm.

18. The system according to claim 12, wherein the cutting blades have cutting edges extending substantially in a vertical direction of the vertical granulator unit.

19. The system according to claim 1, wherein the sifter unit comprises a vibrating sifting stage per classified range of the particles, and an outlet arrangement for separately delivering each classified range of the particles.

20. The system according to claim 19, wherein the outlet arrangement of the sifter unit comprises an outlet for delivering powders resulting from sifting.

21. The system according to claim 1, wherein the separator arrangement comprises a separator unit per range of particles classified by the sifter, each separator unit having a tilt table and first and second outlets extending on opposite sides of the tilt table, the first and second outlet arrangements of the separator arrangement being respectively formed of the first and second outlets of each separator unit.

22. The system according to claim 1, further comprising a cyclonic separating and dust filtering arrangement coupled to the separator arrangement, for collecting and separating airborne particles and dust particles among the particles processed by the separator arrangement, and releasing filtered air.

23. The system according to claim 1, further comprising a screw feeder arrangement coupled between the sifter unit and the separator arrangement, for transportation of the particles classified by the sifter to the separator arrangement.

24. A closed circuit, dry process for producing reusable particles of aluminum from aluminum containing products, comprising the steps of:
    crushing the aluminum containing products into chips;
    separating the chips into iron-based chips and ironless chips;
    crushing the ironless chips into chip fragments;
    controlling supply of the chip fragments at a predetermined rate into a granulating chamber through a lower outlet thereof;
    granulating the chip fragments in the granulating chamber into spheroidal particles of aluminum and other particles of organic and carbonic materials;
    producing a controlled upward airflow in the granulation chamber drawing those of the particles exceeding a predetermined granulation degree out of the granulating chamber through an upper outlet thereof;
    classifying the particles as a function of their sizes; and
    separating the classified particles as a function of their weight into the spheroidal particles of aluminum and residues formed by the other particles, the spheroidal particles of aluminum forming the reusable particles of aluminum.

25. The process according to claim 24, wherein the chips have sizes in a range of about 1.25 cm×1.25 cm, the chip fragments have sizes in a range of about 0.63 cm×0.63 cm to 1.25 cm×1.25 cm, and the particles have sizes in a range of about 0.1 mm to 2.5 mm.

26. The process according to claim 24, wherein the step of separating the chips comprises magnetically attracting the iron-based chips.

27. The process according to claim 24, wherein the step of producing the controlled upward airflow comprises drawing air out of the granulation chamber by cyclonic effect.

28. The process according to claim 24, wherein the upward airflow is controlled as a function of a time period to be passed by the chip fragments in the granulation chamber prior to being drawn out of the granulation chamber under a particulate form to conform to the predetermined granulation degree.

29. The process according to claim 24, wherein the step of granulating comprises striking the chip fragments using cutting blades having adjusted angles, distances and positions in the granulation chamber.

30. The process according to claim 24, further comprising the step of filtering dust among the chip fragments and the particles.

31. The process according to claim 30, further comprising the steps of:
    pneumatically transporting the chip fragments and the particles; and
    filtering dusty air released during the step of pneumatically transporting the chip fragments and the particles.

32. The process according to claim 31, wherein the step of pneumatically transporting comprises cyclonic separations at ends of transportation courses followed by the chip fragments and the particles, the step of filtering being performed on the dusty air released during the cyclonic separations.

33. The process according to claim 24, wherein the step of controlling supply comprises adjusting a transfer rate of the chip fragments fed in the granulation chamber.

34. The process according to claim 24, further comprising the step of collecting powders produced during the step of classifying.

35. The process according to claim 24, wherein the spheroidal particles of aluminum recovered after the step of separating have a density of about 88 pounds per cubic foot.

36. The process according to claim 24, further comprising the steps of collecting and separating airborne particles and dust particles among the particles processed in the step of separating, and releasing filtered air.

* * * * *